G. C. JENSEN.
LEVER LOCKING UNIT.
APPLICATION FILED FEB. 13, 1918.
1,271,902.
Patented July 9, 1918.
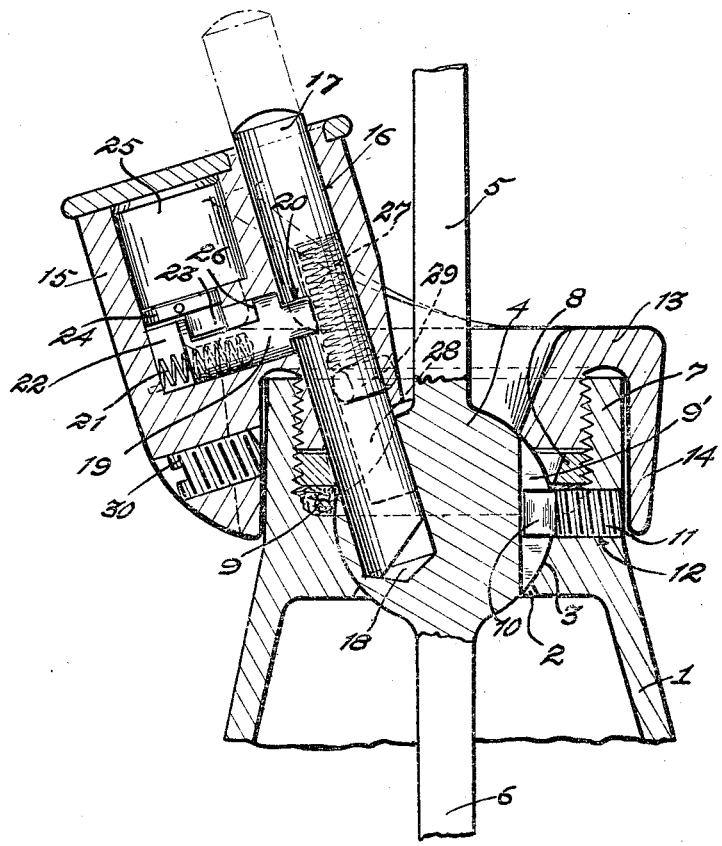
WITNESS:
Wm F. Drew
INVENTOR.
George C. Jensen
BY
Acker & Totten
ATTORNEYS.

UNITED STATES PATENT OFFICE.

GEORGE C. JENSEN, OF OAKLAND, CALIFORNIA.

LEVER-LOCKING UNIT.

1,271,902.   Specification of Letters Patent.   Patented July 9, 1918.

Application filed February 13, 1918. Serial No. 216,963.

*To all whom it may concern:*

Be it known that I, GEORGE C. JENSEN, a citizen of the United States, residing at Oakland, in the county of Alameda and State of California, have invented certain new and useful Improvements in Lever-Locking Units, of which the following is a specification.

The present invention relates to improvements in locking means particularly designed for locking a lever from operative movement or from removal from its fulcrum, whereby unauthorized operation of the controlling levers, particularly those employed in connection with the gear shift levers of motor vehicles is prevented.

The invention consists broadly in providing a lock mechanism adapted for levers preferably of the ball and socket type, and wherein the lock mechanism is carried by the lever retaining collar, and when in operative position locks the collar to the support and the lever in the support.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference should be had to the accompanying sheet of drawings, wherein the figure is a vertical sectional view of the preferred embodiment of my invention.

Referring more particularly to the drawing, wherein like characters of reference designate corresponding parts,—1 indicates a suitable tubular support provided with a bore 2 surrounded by a spherical socket 3 in which is received the spherical fulcrum portion 4 of a lever 5, the lower end 6 of said lever depending into the tubular support 1. An annular internally threaded wall 7 extends upwardly from the spherical socket 3 and in the same is positioned a retaining ring 8 adapted to bear downwardly onto a suitable packing 9 surrounding the spherical portion 4 of the lever, said ring 8 retaining the spherical fulcrum portion 4 of the lever seated within the spherical socket 3. The spherical portion 4 is provided in its side wall with a vertical slot or groove 9' in which is adapted to project the inner end 10 of a guide member 11 threaded into a suitable opening 12 formed in the wall 7. The guide member 11 permits of universal movement of the lever within its spherical socket and precludes axial rotation thereof.

The upper end of the opening formed by the annular wall 7 is adapted to be closed by a collar 13 having threaded engagement with the threaded interior of the wall, and said collar is provided with an overhanging flange 14, which is adapted, when the collar is threaded into position, as in the drawing, to overlie the guide member 11 and prevent removal of the same from its threaded opening. The collar 13 is provided with an outstanding boss 15 formed with a bore 16 extending downwardly therethrough and which is disposed to intersect the spherical fulcrum portion 4 of the lever.

Longitudinally movable within said bore 16 is a locking bolt 17 adapted at its lower end, when in depressed position, to project into a suitable recess or opening 18 in the spherical portion 4 of the lever and thus lock the lever from movement in its socket.

The bolt is retained in locked position by a suitable spring actuated latch 19 arranged at right angles thereto and capable of reception at its outer end in a recess 20 in the side wall of the locking bolt 17, said latch being normally pressed upwardly by a coiled spring 21 positioned within the latch guide opening 22 in the boss 15.

The latch is retracted to release the bolt preferably by a suitable tongue 23 disposed eccentrically of a rotatable barrel 24, the barrel being positioned within a suitable key controlled casing 25. The tongue extends into a recess 26 within the upper side of the latch 19 and it will thus be apparent that on the rotation of the barrel 24 by a suitable controlling key, not shown, inserted in the casing 25, the latch 19 will be retracted, removing the outer end thereof from the recess 20 in releasing the bolt 17. The bolt is restored to unlocked position and normally held therein by a suitable coiled spring 27 mounted in a groove 28 within the bolt and abutting at its lower end against a pin 29 carried by the collar 13 and projecting into the groove 28, the pin also precluding axial rotation of the bolt 17. A set screw 30 passing through the lower portion of the flange 14, abuts against the outer surface of the wall 7 and serves to maintain the collar 13 in its adjusted position with the bolt 17 in line with the opening 18 in the spherical portion 4 of the lever.

It will be apparent by my present construction that the same is carried entirely by the retaining collar universally employed in levers of the ball and socket type, and when said construction is employed and is in locked position, the removal of the collar from the support is prevented, thereby preventing removal of the lever from its socket, and, likewise, all operative movement of the lever within its socket is prevented.

Having thus described my invention, what I claim as new and desire to protect by Letters Patent is:—

1. In combination with a lever, a tubular member through which said lever extends, said member providing a support for the lever and within which the same is mounted for universal swinging movement but relatively to which the lever is precluded from axial rotation, retaining means coöperating with the lever and detachably secured to the tubular member for retaining the lever positioned therein, a lever controlling member carried by said retaining means at an angle to the lever and capable of manual operation to engage said lever to lock the same from operative movement or removal from its fulcrum.

2. A lock for a lever mounted for universal swinging movement on a ball and socket fulcrum, comprising a collar for surrounding the lever and for threaded attachment to the lever support, a boss carried thereby and arranged at an angle thereto, a longitudinally movable locking bolt within said boss and adapted for manual depression to engage the lever, lock controlled means coöperating with said bolt and carried by said boss for retaining the bolt in its locking position, and means for restoring the bolt to normal unlocked position on the release of said lever controlled means.

3. In combination with a lever member provided with a spherical portion and a recess in the region of said spherical portion, a tubular member through which said lever extends with the spherical portion thereof seated therein, said member providing a universal fulcrum for said lever, a ring member surrounding said lever, and engaging said tubular portion for retaining the lever therein, and a longitudinally movable lock controlled locking bolt carried by one of said members and capable of positioning to engage said recess whereby said ring is locked from detachment from said tubular member and said lever is locked from operative movement within its socket.

4. In combination with a lever member provided with a spherical portion, a tubular member through which said lever member extends, with the spherical portion thereof seated therein, said tubular member providing a universal fulcrum for said lever member, a ring surrounding the lever member and in threaded engagement with the tubular member for retaining the lever member seated in its fulcrum, means for preventing axial rotation of the lever member on its fulcrum, and lock controlled means carried by one of said members for engaging the other member whereby said lever is locked from operative movement, and said ring is locked from detachment from said tubular member.

5. A lock for a lever mounted for universal swinging movement on a ball and socket fulcrum comprising a collar surrounding the lever, a longitudinally movable locking bolt within said collar and adapted for manual depression to engage the lever, lock controlled means coöperating with said bolt and carried by said collar for retaining the bolt in its locked position, and means for restoring the bolt to normal unlocked position on the release of said lock controlled means, said bolt when in locked position preventing movement of the lever within its socket or removal of the collar from the lever.

6. A lock for a lever capable of removal from its fulcrum and mounted for universal swinging movement, comprising a collar for surrounding the lever for retaining the same seated in its fulcrum, said collar provided with an open ended bolt receiving bore, a longitudinally movable locking bolt mounted in said bore and of a greater length than the same and adapted on the depression of the same to position the lower end thereof in engagement with the lever to lock the same from movement, lock controlled means within the collar for engaging and retaining the bolt in its locked position, and means for restoring the bolt to normal unlocked position on the release of said lock controlled means.

In testimony whereof I have signed my name to this specification in the presence of two subscribing witnesses.

GEORGE C. JENSEN.

Witnesses:
HARRY A. TOTTEN,
D. B. RICHARDS.

Copies of this patent may be obtained for five cents each, by addressing the "Commissioner of Patents, Washington, D. C."